(12) United States Patent
Huang et al.

(10) Patent No.: US 6,393,434 B1
(45) Date of Patent: May 21, 2002

(54) METHOD AND SYSTEM FOR SYNCHRONIZING DATA USING FINE-GRAINED SYNCHRONIZATION PLANS

(75) Inventors: Yun-Wu Huang, Chappaqua; Roger A. Pollak, Pleasantville; John L. Ponzo, Cortlandt Manor, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/396,924

(22) Filed: Sep. 14, 1999

(51) Int. Cl.⁷ .............................................. G06F 17/30
(52) U.S. Cl. ...................... 707/200; 707/201
(58) Field of Search ................. 707/200, 201, 707/202, 203, 204, 104, 103, 100, 10, 8; 713/400; 370/274

(56) References Cited

U.S. PATENT DOCUMENTS

| | | | | |
|---|---|---|---|---|
| 5,684,984 A | * | 11/1997 | Jones et al. ..................... | 707/10 |
| 5,710,922 A | * | 1/1998 | Alley et al. ................... | 707/201 |
| 5,758,355 A | | 5/1998 | Buchanan ..................... | 707/201 |
| 5,774,717 A | | 6/1998 | Porcaro ........................ | 707/202 |
| 5,806,075 A | * | 9/1998 | Jain et al. ..................... | 707/201 |
| 5,878,434 A | * | 3/1999 | Draper et al. ................ | 707/202 |
| 5,884,325 A | * | 3/1999 | Bauer et al. .................. | 707/201 |
| 5,924,096 A | * | 7/1999 | Draper et al. ................. | 707/10 |
| 5,991,771 A | * | 11/1999 | Falls et al. .................... | 707/202 |
| 6,021,118 A | * | 2/2000 | Houck et al. ................ | 370/274 |
| 6,088,706 A | * | 7/2000 | Hild ............................. | 707/202 |
| 6,205,448 B1 | * | 3/2001 | Kurglikov et al. ........... | 707/200 |
| 6,212,529 B1 | * | 3/2001 | Boothby et al. ............. | 707/201 |
| 6,247,135 B1 | * | 6/2001 | Feague ........................ | 713/400 |

OTHER PUBLICATIONS

Parker et al. "Detection of Mutual Inconsistency in Distributed Systems", IEEE Transactions on Software Engineering, vol. SE–9, No. 3, May 1983.
Reiher, et al. "Resolving File Conflicts in the Ficus File System", Proceedings of the Summer USENIX Conference, pp. 183–195, Jun. 1994.

* cited by examiner

*Primary Examiner*—Sanjiv Shah
(74) *Attorney, Agent, or Firm*—F. Chau & Associates, LLP

(57) ABSTRACT

There is provided a method and system for performing synchronization between a first replica associated with an application in a first computer processing device and a second replica associated with the application in a second computer processing device. The method includes the step of generating a synchronization plan for the replicas for managing the synchronization therebetween. The sync plan includes data structure information corresponding to data structures of the replicas, storage access information for enabling access to each individual data unit within the data structures of the replicas, and synchronization and conflict resolution actions for specifying actions to be taken for each individual data unit with respect to the synchronization and any conflicts resulting therefrom. At least one individual data unit in the first replica is synchronized with a corresponding individual data unit in the second replica, in accordance with the sync plan.

37 Claims, 13 Drawing Sheets

METHOD AND SYSTEM FOR SYNCHRONIZING DATA USING FINE-GRAINED SYNCHRONIZATION PLANS

BACKGROUND

1. Technical Field

The present invention relates generally to the field of data synchronization and, in particular to the update synchronization process between data in one computer processing device and their replicas in another computer processing device, with data transmission enabled by a wired or wireless computer network.

2. Background Description

The data synchronization process, or the sync process, refers to the computation process that brings different database replicas of an application (e.g., a calendar application, an address book application, a relational database table) into a synchronized state. For the purposes of the present invention, a synchronized state can be either a consistent state or an identical state. A consistent state between multiple database replicas of an application means that the final differences between these replicas are caused by the user's choice and, therefore, are anticipated by the user.

For example, a user may synchronize the Address Book application in his Palm Pilot with his Lotus Notes system in his personal computer (PC). Typically, the user may choose the option to synchronize the two Address Book replicas into an identical state. This means that all the information which participates in the sync process from one replica is also properly represented in the other replica. It is to be noted that not every item in an application from one device may participate in the sync process. For example, some items in a Lotus Notes Address Book record may not have corresponding items in a Palm Pilot's Address Book application. Hence they do not participate in the sync process and are irrelevant to the resulting sync state. We also note that the same information may be represented by different storage or syntactical formats in various systems. For example, the dates "May 20, 1999" in one device and "May 20, 1999" in another device represent the same date though their physical appearances are different.

As an alternative to achieving an identical state as a result of synchronization, the user may choose the option to synchronize two items to a consistent state. For example, in synchronizing the E-mail application between the Palm Pilot and the Lotus Notes, the user may specify that only new e-mail items from the Palm Pilot are to be transmitted to the Lotus Notes system whereas new e-mail items from the latter are not to be sent to the former during the current sync process. Such a situation may occur when the user is in a hurry to send an e-mail composed in the Palm Pilot through the Lotus Notes, and the full two-way sync process may be too long to wait for.

With respect to the above example, the database replicas of the two e-mail systems may not be in an identical state after synchronization because new e-mail items may exist in the Lotus Notes but not in the Palm Pilot. But if all new e-mail items from the Palm Pilot are properly represented in the Lotus Notes, the two replicas are in a consistent state as their differences are the results of the user's choice. It is to be noted that a consistent state can be brought to be an identical state later by a sync process with the user choosing a two-way complete sync.

An important issue in data synchronization is the handling of conflicts. A conflict occurs when the same record represented in multiple database replicas has, since the last sync process, been independently modified in such a way that, among all replicas, no single version of this record can be determined to be more current than any others. For example, the phone number of an Address Book record (e.g., in the record for John Doe) has been independently changed in both the Palm Pilot and the Lotus Notes since the user last synchronized the two systems. Suppose at least one of the systems (e.g., the Palm Pilot) does not support a reliable time-stamp that records exactly when a record is modified. When the user synchronizes the two systems again, if the two new phone numbers for John Doe from each of the two systems are different, then the sync process cannot determine if either number is more current than the other number. The two versions of the same record (that of John Doe) therefore create a conflict.

Those skilled in the art will appreciate that conflicts may not be caused by independent updates alone (referred to as the update-update conflict). Deleting a record in a system (e.g., the Palm Pilot) may also cause a conflict if a replica of this record has been updated independently in another system (e.g., Lotus Notes) since the two systems last synchronized (referred to as the delete-update conflict or update-delete conflict).

Thus, for the sync process to bring multiple replicas of the same information into a synchronized state, the sync process should detect whether there exist conflicts among these replicas, and, if so, then the sync process should resolve these conflicts. Typically, the sync process performs the preceding steps (detecting and resolving conflicts) by invoking specialized conflict resolution procedures to handle conflicts.

Prior art in conflict handling during data synchronization can be generally categorized into three approaches. The first approach allows the user or the administrator of the system to specify some record-based (or coarse-grained) default actions for an application when conflicts occur. For example, the user (or the administrator) can configure the system such that if an update conflict occurs while synchronizing the Address Book application between the Palm Pilot and the Lotus Notes, then the updated record from the former always overrides that from the latter (or vice versa). The set of actions for resolving conflicts typically include: (1) updates from one system always override updates from the other system, or vice versa (for update-update conflict); (2) updates always override deletes, or vice versa (for update-delete conflict); and (3) rename (change the identity of) the record of one system, or vice versa (for update-update conflict).

In the first approach, the sync process typically treats each record (such as, for example, an Address Book record, a Calendar record, a Expense Application record, and so forth) as an atomic unit and does not have knowledge of the detailed formats inside these records. Therefore, we call this approach coarse-grained because the conflict resolution actions always involve the whole record (e.g., the entire Address Book record for John Doe) and not the more detailed information inside each record (e.g., the last name, phone number, zip code for John Doe). This approach is generally referred to as the default-setting approach.

The second approach allows for fine-grained handling of conflict by way of the sync process. In particular, while synchronizing an application, an executable code (referred to as a plug-in) developed specifically for this application is loaded and executed. All the details in synchronizing data from different replicas such as retrieving data, inserting data, updating data, detecting conflicts, and resolving conflicts are handled in this plug-in. The plug-in for an application may be developed by the developer of the application, and not the developer of the synchronization system. For example, the plug-in (also referred to as the "conduit") for synchronizing the E-mail application between the Palm Pilot and the Lotus Notes is developed by the Lotus Notes organization that supplies the Lotus Notes E-mail application, and not by the Palm Pilot organization that supplies the synchronization system called HotSync. Because the application developers have full knowledge of the data format of their application, the plug-in they develop for their application can manipulate detailed information inside each record for synchronization or conflict resolution. This approach is generally referred to as the plug-in approach.

The third approach is similar to the first approach in that the sync process provides record-based conflict resolution settings to handle conflicts. However, this approach differs in that these settings are not configured beforehand (before the sync process takes place), but can be set by the user after conflicts are detected during synchronization. For example, in a typical synchronization scenario, a user uses a mobile computer processing device (such as a Palm Pilot) to synchronize an application with a stationary computer processing device (such as a database server). Upon detecting a conflict during synchronization, information about this conflict is then sent to the Palm Pilot which displays this information. The user may then specify a record-based (coarse-grained) action to resolve this conflict. The set of actions that the user may specify to resolve a conflict is similar to those specified in the first approach.

One of the problems plaguing the first and third approaches is that they lack the fine-grained control of data synchronization and conflict resolution. For example, consider the following scenario. If a user, while synchronizing an application between a mobile device and a server, chooses to override one field from the mobile device to the server and another field of the same record from the server to the mobile device to resolve a conflict, he cannot achieve this objective using the first and the third approaches. One of the problems plaguing the second approach is that the plug-in is written in a certain programming language. The conflict resolution logic, once written with a programming language, stays the same until it is rewritten and redeployed. For example, the user may choose to handle conflicts based on a configuration written as logic embedded in a plug-in code. If the user later decides to choose a different configuration, such as, for example, reversing the override directions for some fields, then the plug-in for the different configuration must be rewritten.

Writing and rewriting a plug-in involves a set of skills usually not possessed by the typical user. It also requires a software development process that typically involves code changes, code compilation, code testing, and code deployment. It is a time consuming process. Therefore, the user cannot switch from one conflict resolution configuration to another with a high frequency. In other words, conflict resolution and synchronization control cannot be managed by the user in a dynamic fashion. Furthermore, a synchronization system typically involves more than one user. For example, many users may each have a mobile device that can synchronize with one or more servers. In a scenario where each user has a synchronization and conflict resolution configuration that may be different from the other users, each different configuration will need to have a unique plug-in. The arbitrary enumeration of potentially a large number of plug-ins for one application creates such high complexity that it renders the synchronization system difficult to operate and maintain.

Thus, it would be desirable and highly advantageous to have a method and system in which a user may specify a synchronization and conflict resolution configuration in a dynamic manner.

SUMMARY OF THE INVENTION

The present invention is directed to a method and system for synchronizing data using fine-grained synchronization plans. The present invention overcomes the above described problems of the prior art and provides a method and system in which a user may specify a synchronization and conflict resolution configuration in a dynamic manner (which is not achievable by the first and second prior art approaches described above) and with a fine-grained control (which is not achievable by the first and third prior art approaches) with or without user interaction during synchronization (which is not achievable by the third prior art approach).

According to a first aspect of the present invention, there is provided a method for performing synchronization between a first replica associated with an application in a first computer processing device and a second replica associated with the application in a second computer processing device. The method includes the step of generating a synchronization plan for the replicas for managing the synchronization therebetween. The sync plan includes data structure information corresponding to data structures of the replicas, storage access information for enabling access to each individual data unit within the data structures of the replicas, and synchronization and conflict resolution actions for specifying actions to be taken for each individual data unit with respect to the synchronization and any conflicts resulting therefrom. At least one individual data unit in the first replica is synchronized with a corresponding individual data unit in the second replica, in accordance with the sync plan.

According to a second aspect of the present invention, the method further includes the step of organizing the data structure information in a hierarchal order.

According to a third aspect of the present invention, the hierarchal order may include a replica level corresponding to the entire replica and an indivisible data unit level corresponding to a smallest possible data unit within the data structures.

According to a fourth aspect of the present invention, the method further includes the step of enabling an individual to create, update, or delete the synchronization plan using an input/output device of the first and/or the second computer processing devices.

According to a fifth aspect of the present invention, the method further comprises the step of generating a mapping of the data structures of the first and the second replica so as to link each data unit participating in the synchronization in the first computer processing device with a corresponding data unit in the second computer processing device.

According to a sixth aspect of the present invention, the data structures of the first and the second replicas are different.

According to a seventh aspect of the present invention, the first and the second computer processing devices are coupled through a network.

According to an eight aspect of the present invention, the synchronizing step is performed in the first or the second computer processing device.

According to a ninth aspect of the present invention, the method further includes the step of storing the synchronization plan in the first or the second computer processing device.

According to a tenth aspect of the present invention, the synchronizing step is performed by the first or the second computer processing device, and further includes the step of determining and retrieving the portions of the first and the second replicas that are to be replicated, in accordance with the synchronization plan. It is determining whether any conflicts exist between the portions of the first and the second replicas that are to be replicated. If such conflicts exists, then they are resolved in accordance with the synchronization plan. The portions of the first and the second replicas that are to be replicated are then replicated in accordance with the synchronization plan and the mapping.

According to an eleventh aspect of the present invention, one or more of the two replicas are stored or obtained by an other computer processing device having a continuous or an intermittent connection to the network.

According to a twelfth aspect of the present invention, the synchronizing step is performed in the other computer processing device.

According to a thirteenth aspect of the present invention, the method further includes the step of storing the synchronization plan in the other computer processing device.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1:
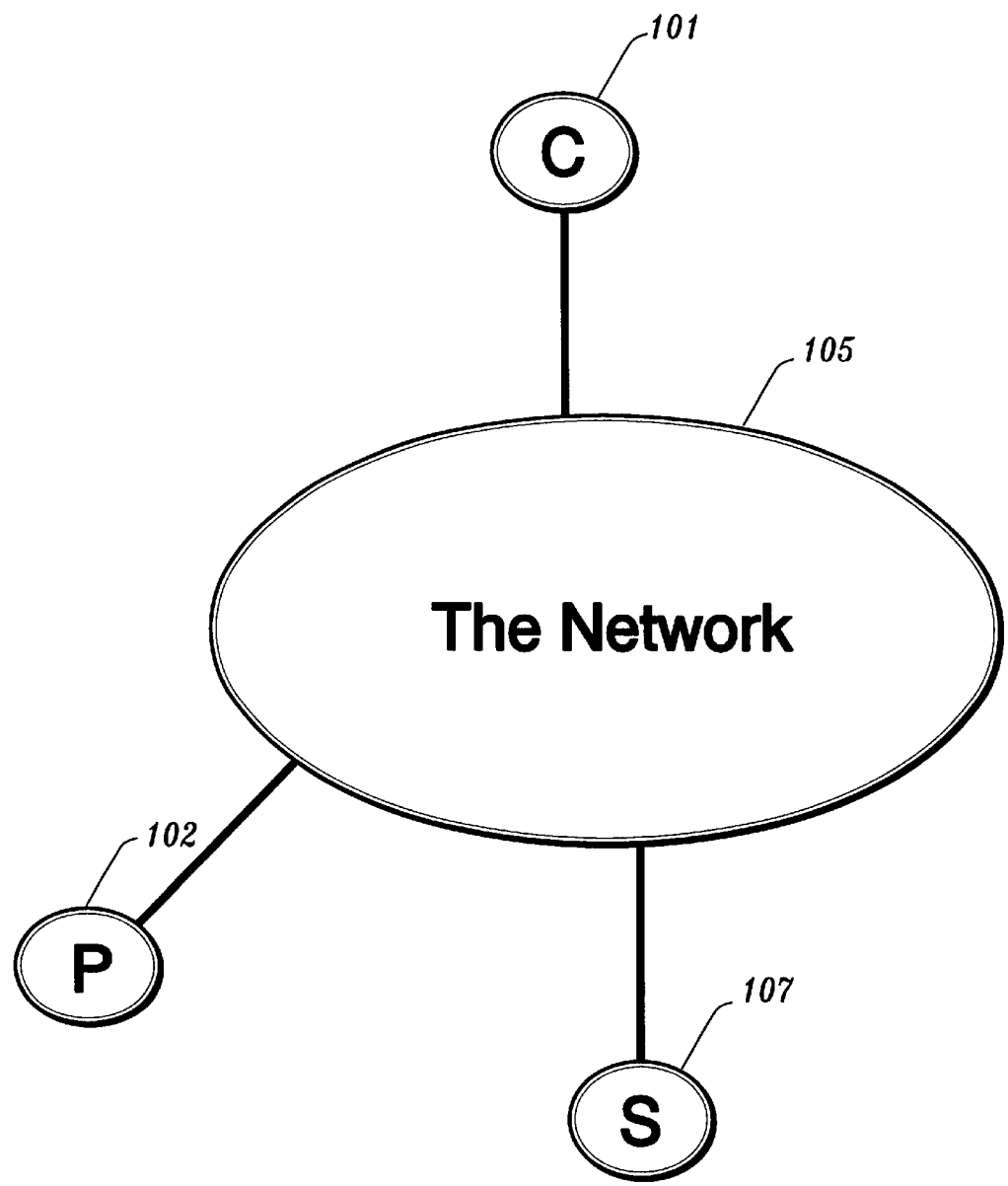
FIG. 1 is a diagram illustrating a synchronization architecture according to an embodiment of the present invention.

The present invention is directed to a method and system for synchronizing data using fine-grained synchronization plans.

To facilitate a clear understanding of the present invention, definitions of terms employed herein will now be given. A data synchronization process (or sync process) refers to a computation process that brings different database replicas of an application into a synchronized state. A target object (e.g., target application, target record, and so forth) is an object located in a computer processing device that is to be synchronized. A replica is a corresponding facsimile of an object (e.g., the target object) in another computer processing device. A record is an element of an object to be synchronized. A data unit as used herein may correspond to an entire replica, an indivisible element thereof, or any size element therebetween. An API (Application Program Interface) is the specific method prescribed by a computer operating system or by another application program by which a programmer writing an application program can make requests of the operating system or another application. A sync API refers to the preceding method used for a synchronization purpose.

A data object (e.g., a file) referred to as a "sync plan" contains information corresponding to the synchronization process and for resolving conflicts occurring during the synchronization process. The sync plan may be detailed such that every atomic data unit within an object to be synchronized (e.g., an application, a record, and so forth) can have its own unique synchronization and conflict resolution actions specified in the sync plan. An example sync plan for an application may contain the following three pieces of information: (1) the structure of the data of the associated application (referred to herein as "data structure information"); (2) the storage information for each individual data unit within the data structure which can be used to access (e.g., read, write, or update) each individual data unit (referred to herein as "storage access information"); and (3) the synchronization and conflict resolution actions associated with each data unit in the data structure (referred to herein as "sync action configuration").

A data object referred to as a "sync schema" contains information corresponding to at least the following: (1) the aforementioned data structure information of the object to be synchronized; and (2) a mapping between the data structures of the objects to be synchronized in the two computer processing devices that links each data unit participating in the synchronization process in one of the computer processing devices with its counterpart in the other computer processing device.

It is to be understood that the present invention may be implemented in various forms of hardware, software, firmware, special purpose processors, or a combination thereof. Preferably, the present invention is implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Moreover, because some of the constituent system components and method steps depicted in the accompanying Figures may be implemented in both hardware and software, items bearing the same reference numeral may be referred to in manner indicative of both hardware and software. Given the teachings herein, one of ordinary skill in the related art will be able to contemplate these and similar implementations or configurations of the present invention.

FIG. 1 is a diagram illustrating a synchronization architecture according to an embodiment of the present invention. A client device (hereinafter "client") 101 is operatively coupled to a server 107 and a proxy 102 through a network 105. The client 101 can be any computer processing device which runs one or more applications that are amenable to synchronization. In the embodiment of FIG. 1, synchronization takes place between the client 101 and the server 107. In a preferred embodiment, the client 101 is a handheld device (e.g., a Palm Pilot, a smart phone, or an intelligent pager) that is only intermittently disconnected from the network 105, and that requires synchronization with the server to update or backup it's data. The server 107 and the proxy 102 can be any computer processing device, such as, for example, a PC, a workstation, a mainframe, and so forth. In a preferred embodiment, the server 107 and the proxy 102 are connected to the network 105 on a substantially continuous basis.

In a preferred embodiment, the client 101 connects to the proxy 102, and the proxy 102 performs the synchronization task between the client 101 and the server 107. A handheld client (such as a Palm Pilot) can obtain a connection to a network (such as the Internet or a local area network (LAN)) by dialing up to a network remote access server through a modem, or by having a direct serial-port connection (e.g., using the Palm Pilot cradle) to a computer (e.g., a desktop PC) that is connected to the network 105. Those skilled in the art will appreciate that the synchronization task can also be performed directly between the client 101 and the server 107 with the synchronization computations taking place in either the client 101 or the server 107.

Figure 2:
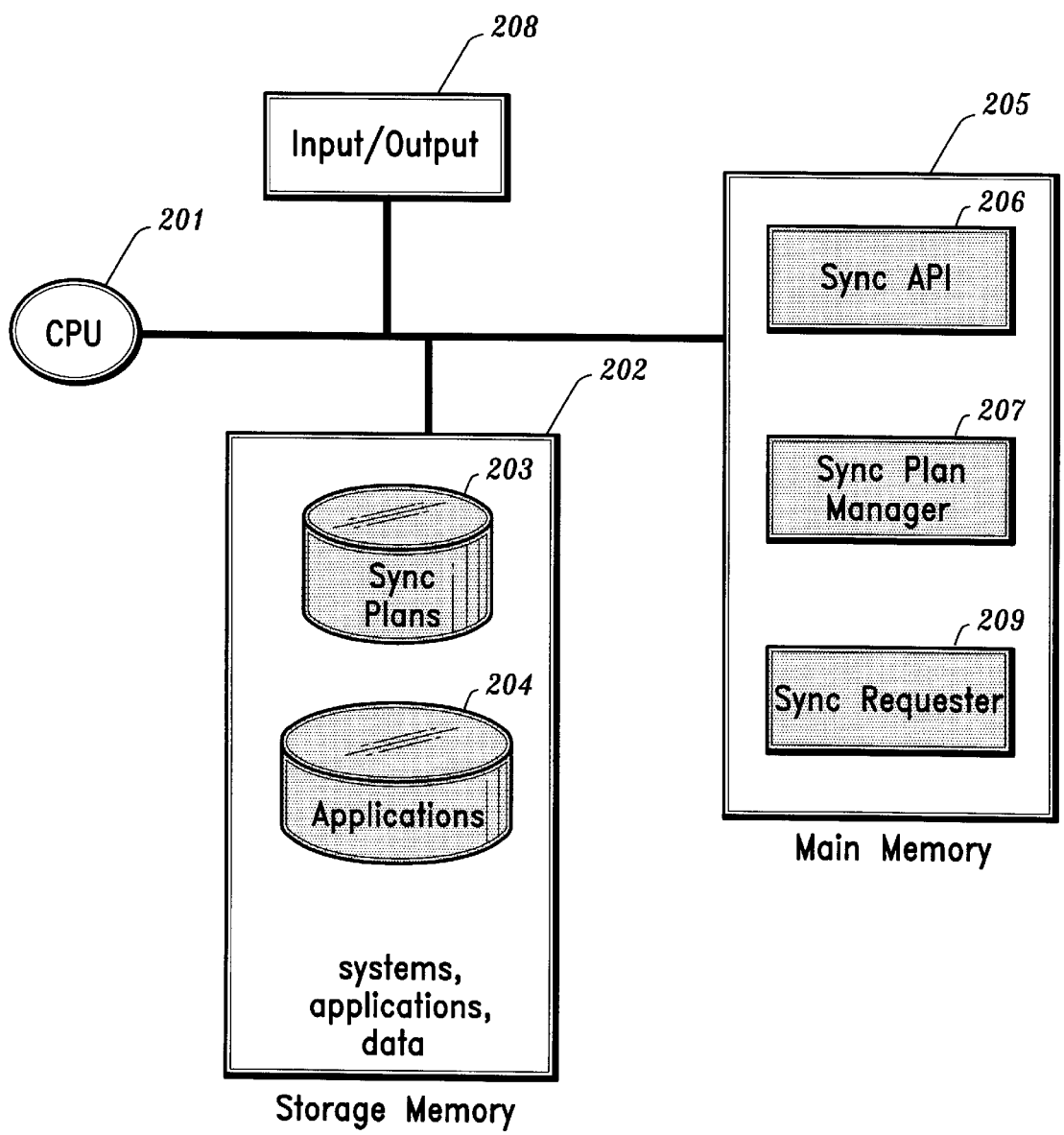
FIG. 2 is a diagram illustrating an architecture of a server or a client according to an embodiment of the present invention.

FIG. 2 is a diagram illustrating an architecture of a server 107 or a client 101 according to an embodiment of the present invention. In a preferred embodiment, the client 101 is a mobile device whereas the server 107 is a data storage host. However, it is to be appreciated that, as stated above, the client 101 and the server 107 may be any computer processing device, including the same type of computer processing device.

According to an illustrative embodiment of the present invention, an example server 107 or client 101 includes: a CPU 201; input/output devices 208 such as, for example, a keyboard and a display device; main memory 205 such as, for example, volatile RAM (random access memory); and storage memory 202, such as, for example, nonvolatile RAM, ROM (read only memory), or disk-based memory (hereinafter "disk"), such as, for example, magnetic and optical disks). In general, the main memory 205 stores programs being executed, and the storage memory 202 stores systems (such as the operating system), applications 204 (such as the e-mail and calendar software) not currently being executed, as well as data (such as the content of the Address Book). The distinction between the main memory and the storage memory may not exist for some devices such as the Palm Pilot as it stores all information in RAM and ROM without any disks, and executes programs directly from where they are stored.

In a preferred embodiment of the present invention, sync plans 203 are stored in the storage memory 202. A detailed example of a sync plan is described further with respect to FIG. 13 below. The user can configure the sync plans through a sync plan manager 207 (described further with respect to FIG. 4 below), which is executable code that is loaded into the main memory 205 for execution. The executable code used by the server 107 or the client 101 to communicate with the proxy 102 (or directly with the counterpart client of the server 107) for synchronization is referred to as a sync API (Application Program Interface) 206 (further described with respect to FIG. 13 below). The synchronization process is initiated by the user invoking a sync requester 209 (further described with respect to FIG. 5 below) which is executable code that the client 101 runs to establish a connection and send a sync request to the proxy 102 or the server 107.

Figure 3:
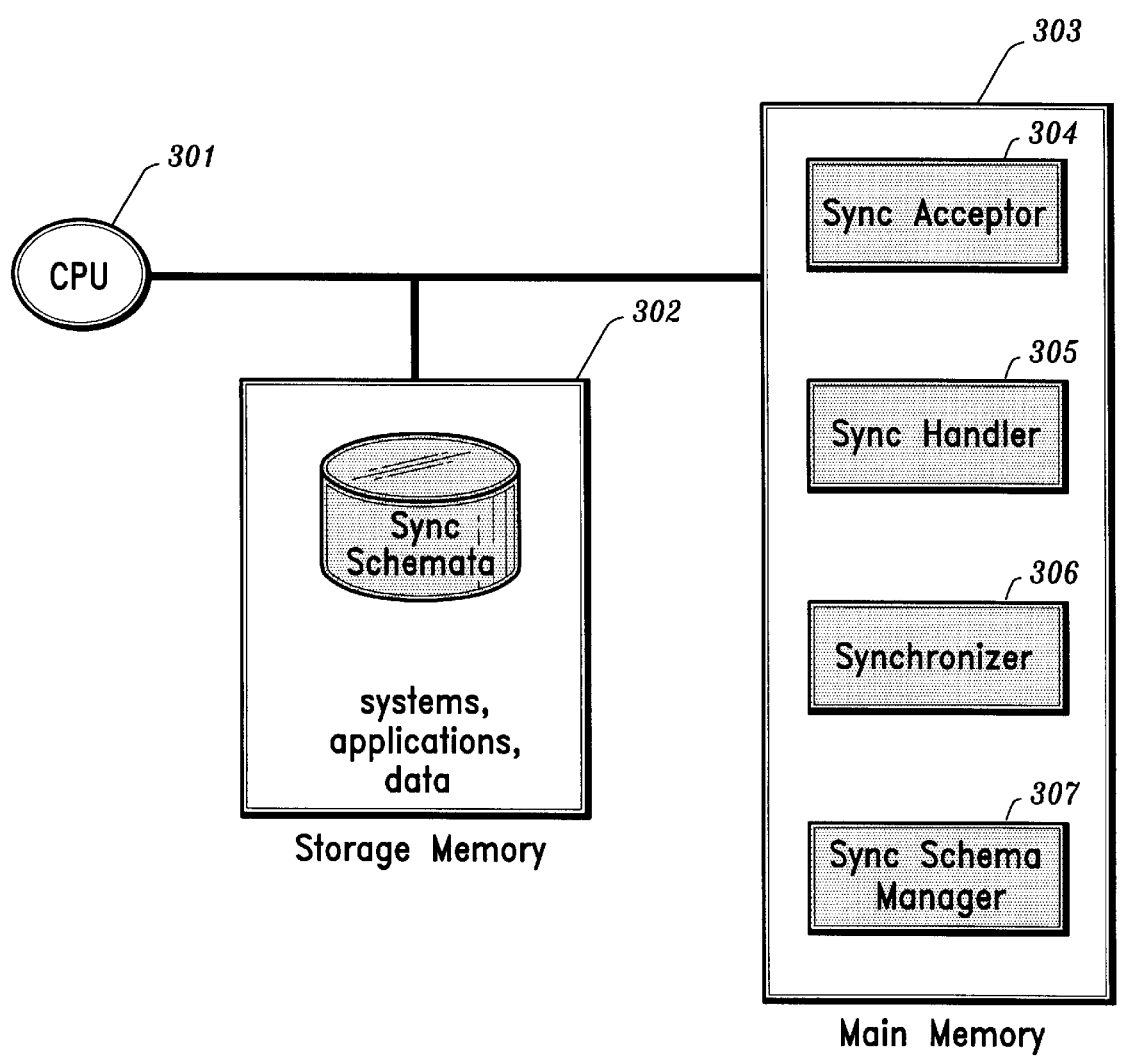
FIG. 3 is a diagram illustrating an architecture of a sync proxy according to an embodiment of the present invention.

FIG. 3 is a diagram illustrating an architecture of a proxy 102 according to an embodiment of the present invention. The proxy 102 can be, for example, a PC, a workstation, a mainframe, and so forth. It can include, for example: a CPU 301; storage memory 302 (e.g., disks); and main memory 303 (e.g., RAM). According to the embodiment of FIG. 3, the main memory 303 stores synchronization (sync) proxy logic (304, 305, 306, and 307). The sync proxy logic is preferably embodied as computer executable code which may be loaded from the storage memory 302 into the main memory 303. The sync proxy logic includes a sync acceptor 304 (further described with respect to FIG. 7 below), a sync handler 305 (further described with respect to FIG. 8 below), a synchronizer 306 (further described with respect to FIG. 9 below), and a sync schema manager 307 (further described with respect to FIG. 10 below). A sync schema according to an illustrative embodiment of the present invention is described with respect to FIG. 13.

Figure 4:
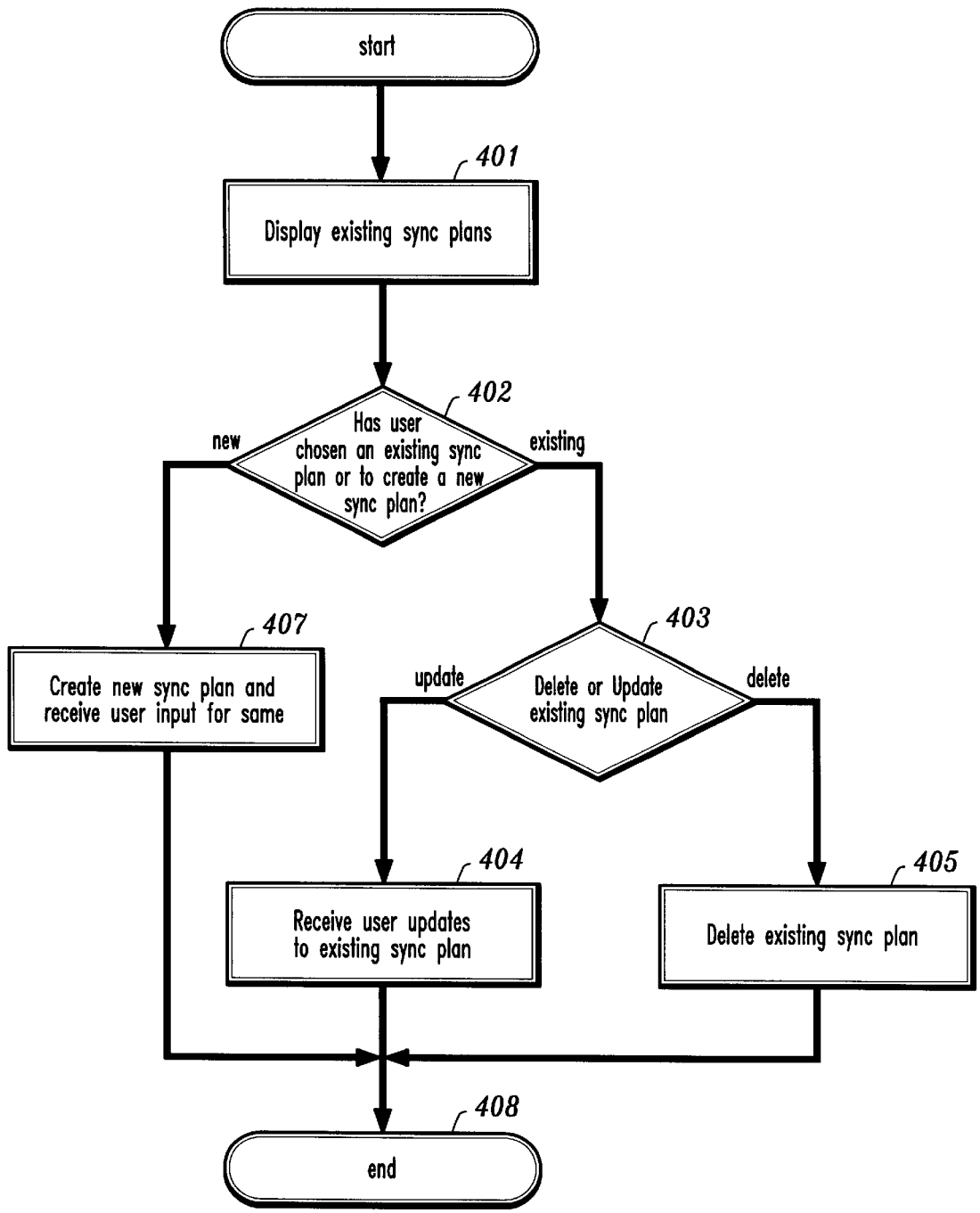
FIG. 4 is a flow chart illustrating a process performed by a sync plan manager according to an embodiment of the present invention.

It is to be appreciated that while a sync plan manager process (as shown in FIG. 4 below) is omitted from the embodiment of FIG. 3, the sync plan manager process may be readily implemented in various other embodiments that maintain the spirit and scope of the present invention. It is to be further appreciated that while a sync schema manager 307 is included in the proxy 102, as shown in the embodiment of FIG. 3, the sync schema manager 307 may be readily implemented in the client 101 or the server 107 or both. The sync schema manager 307 may be implemented in the client 101 and/or the server 107 in the case when proxies are not used.

FIG. 4 is a flow chart illustrating a sync plan manager process 207 according to an embodiment of the present invention. The sync plan manager process 207 can be invoked by the user or the administrator to create or update a sync plan. The user or the administrator can interact with the sync plan manager process 207 using user interface functions through the input/output devices 208 (e.g., keyboard, display device, pen input).

Upon starting the sync plan manager, a list of existing sync plans is displayed (step 401), and it is determined whether the user has chosen an existing sync plan or to create a new sync plan (step 402). If the user has chosen to create a new sync plan, a new sync plan structure is created and sync plan information regarding the same is received (by user input) (step 407) before the sync plan manager process is terminated (step 408).

On the other hand, if the user has chosen an existing sync plan, then it is determined whether the user has further chosen to delete or update the existing sync plan (step 403). If the user has chosen to delete the existing sync plan, then the existing sync plan is deleted (step 405). On the other hand, if the user has chosen to update the existing sync plan, then updated sync plan information for the existing sync plan is received (by user input) (step 404). Upon receiving information for the new sync plan (at step 407), receiving updates to the existing sync plan (at step 404), or deleting the existing sync plan (at step 405), the sync plan manager process 207 is terminated (step 408).

As stated above, a sync plan may include three items of information, namely the data structure information, the storage access information, and the sync action configuration. An implementation of the present invention can adopt certain policies to control how sync plans can be updated and created. For example, it is possible that within an organization, an administrator of the server 107 or the proxy 102 has the authority to create, delete, and update the entire information of a sync plan. In contrast, on the client side, a user using the client 101 (such as a Palm Pilot) may only have authority to update the sync action configuration portion of a sync plan. If this is the policy, then the sync plan manager process depicted in FIG. 4 describes the server-side sync plan manager process whereas the client-side sync plan manager process is depicted by a subset of FIG. 4 (namely, steps 401, 404, and 408 in which only the update of sync action configuration is allowed in step 404).

Figure 5:
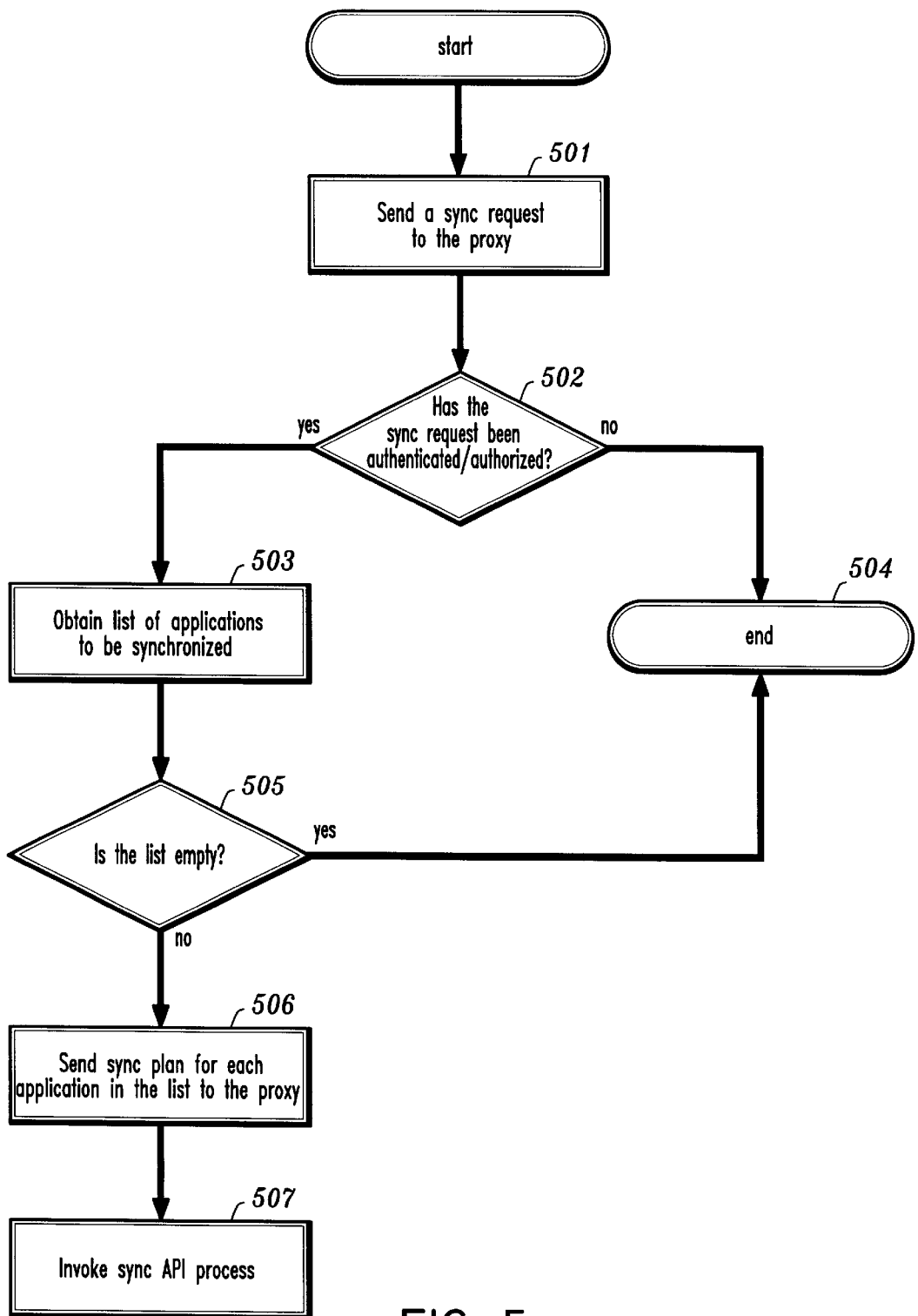
FIG. 5 is a flow chart illustrating a sync requester process according to an embodiment of the present invention.

FIG. 5 is a flow chart illustrating a sync requester process 209 according to an embodiment of the present invention. The sync requester process 209 can be invoked by the user to initiate a synchronization request from the client 101 or the server 107. The user invokes the sync request message to the proxy 102 to start the synchronization task.

When the sync requester 209 is first started, it establishes a connection to the proxy 102 and sends a sync request to the proxy 102 (step 501). The address of the proxy 102 can be a URL (Uniform Resource Locator) or an IP (Internet Protocol) address (or host name) and port number pair. The address of the proxy 102 can be pre-configured or dynamically obtained through a third party (e.g., a directory service host with a known address) by the client 101 or the server 107.

The sync requester 209 might need to send some identification information (such as a user ID and password) to the proxy 102 to be properly authenticated and authorized. In the embodiment of FIG. 5, such identification information is presumed to be required. Accordingly, it is determined whether the sync request has been authorized/accepted by the proxy 102 (step 502). If the sync request has not been authorized by the proxy 102, then the sync requester process terminates (step 504). On the other hand, if the sync request has been authorized by the proxy 102, then the sync requester obtains a list of applications that are to be synchronized (step 503). It is then determined whether the list is empty (step 505). If the list is empty, then the process is terminated (step 504). On the other hand, if the list is not empty, then, for each application to be synchronized, the sync requester sends the sync plan of the application to the proxy 102 (step 506) and invokes the sync API process 206 (step 507). The sync API process 206 continuously waits for the API message calls from the proxy 102 and invokes corresponding API functions that update data in the client 101 (or the server 107) to achieve a synchronized state.

Figure 6:
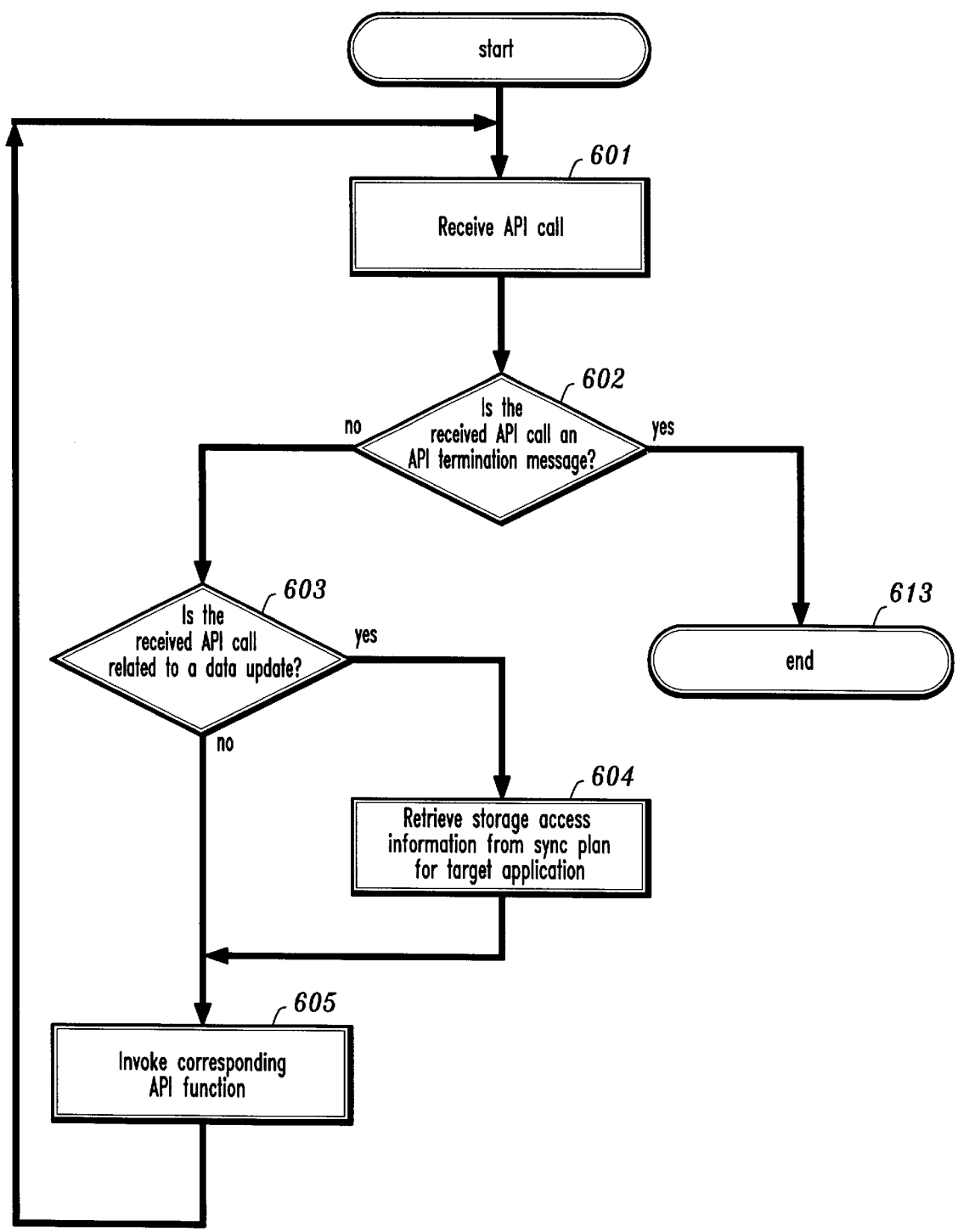
FIG. 6 is a flow chart illustrating a sync API process according to an embodiment of the present invention.

FIG. 6 is a flow chart illustrating a sync API process 206 according to an embodiment of the present invention. The sync API process 206 is performed in the client 101 or the server 107. When the sync API process 206 is invoked, a connection from its host system (the client 101 or the server 107) to the proxy 102 has already been established and the sync request accepted by the sync requester process 209 (shown in FIG. 4).

The sync API process 206 receives an API call from the proxy 102 (step 601). In one embodiment of the invention, API calls are received continuously from the proxy 102 one at a time. It is determined whether the received API call is an API termination message (step 602). If the received API call is an API termination message, then the sync API process 206 terminates (step 613). On the other hand, if the received API call is not an API termination message, then the sync API process 206 determines if the received API call is related to a data update (step 603). If the received API call is related to a data update, then the storage access information in the sync plan of the target application is retrieved (step 604). The storage access information provides the sync API process 206 with the exact location in the storage memory of the target data unit that is to be updated. Upon performing step 604 or if the received API call is not related to a data update, then the sync API process 206 invokes an API function corresponding to the API calls made by the proxy 102 (step 605) and returns to step 601.

With respect to the sync API process 206 of FIG. 6 (step 605 in particular), consider the following scenario. An API call from the proxy 102 requests the update of the street number of John Doe in the Address Book application with the new street number data. Upon receiving this call, the sync API process 206 retrieves the Address Book sync plan and examines the storage access information of the street number field, which may contain information such as the offset to the beginning of each record and the length of this field. Based on the offset and length information, the sync API process 206 then updates only this field (street number) in John Doe's record in the storage memory.

According to the coarse-grained synchronization methods of the prior art, if John Doe's Address Book information is changed, then the whole new record needs to be transmitted from the proxy 102 and written over the existing old record, since the synchronization process in the client 101 or the server 107 does not possess the knowledge of the data structure and the storage access information inside each record. According to the sync plan configuration of the present invention, only the information that is actually changed (which may only be a small portion of an entire record) is transmitted from the proxy 102 and updated in the storage memory of the client 101 or the server 107. Since, in many cases, less network bandwidth will be required between the proxy 102 and the client 101 or the server 107, the efficiency of the overall synchronization process is increased. Moreover, memory update activities are lessened.

Figure 7:
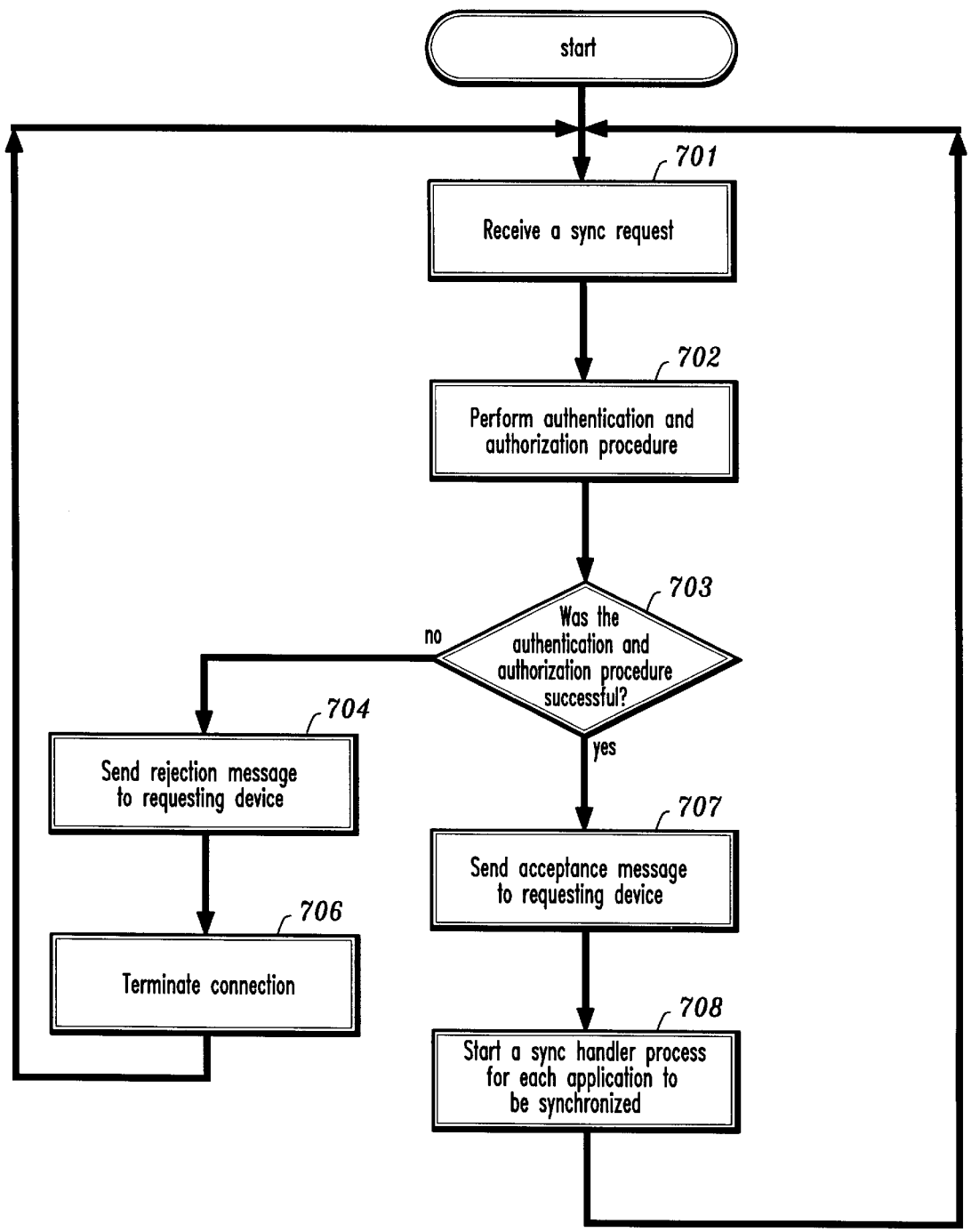
FIG. 7 is a flow chart illustrating a sync acceptor process according to an embodiment of the present invention.

FIG. 7 is a flow chart illustrating a sync acceptor process 304 according to an embodiment of the present invention. The first task of the sync proxy 102 is to start the sync acceptor process 304. The sync acceptor process 304 is a infinitely looping process wherein the sync proxy 102 continuously receives sync requests from the client 101 or the server 107 (step 701). Upon receiving a sync request, the sync acceptor process 304 performs the aforementioned authentication and authorization procedure based on existing authentication and authorization technologies (step 702), and the identification information (such as the user ID and password) inside the request messages received from the requesting devices. It is then determined whether the authentication and authorization procedure has been successfully performed (step 703). If not (i.e., the requesting user failed authentication or is not authorized for synchronization by this sync proxy), then the proxy 102 sends a rejection message back to the requesting device (step 704), terminates the connection (step 706), and returns to step 701. On the other hand, if the authentication and authorization procedure was successful, then the proxy 102 sends an acceptance message back to the requesting device (step 707). Next, the proxy starts the proxy sync handler 305 (described further with respect to FIG. 8 below) for each application to be synchronized (step 708), and returns to step 701.

Those skilled in the art will appreciate that the sync acceptor process can be best implemented with a multithread approach under current software technology. This means that upon receiving a request from a handheld device (step 701), the sync acceptor starts a new thread to process the remaining steps (702–706) for this request. Those skilled in the art will also appreciate that in a operating system that does not support threads, the creation of a new thread can be thought of as creating a new process. The termination of a thread is therefore equivalent to the termination of a process.

Figure 8:
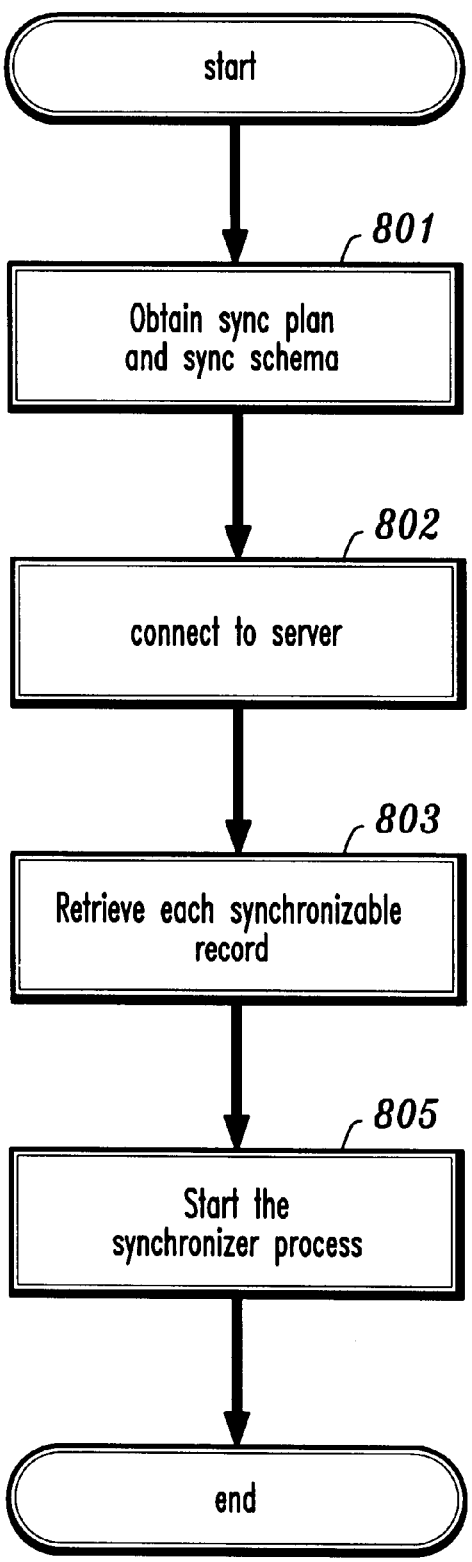
FIG. 8 is a flow chart illustrating a sync handler process according to an embodiment of the present invention.

FIG. 8 is a flow chart illustrating a sync handler process according to an embodiment of the present invention. A sync handler process is started by the sync acceptor process 304 (at step 705 of FIG. 7) for each application to be synchronized (referred to as the target application). To conduct synchronization for all target applications, the proxy 102 may retrieve from the client 101 the target application names one at a time. Upon receiving an application name, the proxy 102 may immediately conduct the sync handler for this application. It is also possible that the proxy 102 retrieves the entire list of the names of the target applications by using one API call (such as, for example, "getAllApplicationToSync") and starts a sync handler process (as shown in FIG. 8) for each application in the list.

The sync handler starts by obtaining the sync plan and sync schema for this synchronization task (step 801). The sync plan for the target application can be passed from the client 101, the server 107, or a third party (e.g., a known directory service). Alternatively, the sync plan could be directly configured in the proxy 102. The sync schema of this synchronization task, which is based on the target application (e.g., Addressbook), the specific system types of the client 101 (e.g., Palm Pilot) and the server 107 (e.g., Lotus Notes), is obtained by the proxy 102 from either the client 101, the server 107, the proxy 102 itself, or a third party host (e.g., a directory service).

Next, the sync handler resolves the network address of the replica in the server 107 (e.g., Address Book in Lotus Notes) that is to be synchronized with the application in the client 101 (e.g., Address Book in Palm Pilot) and establishes a connection to the replica in the server 107 (step 802). In a preferred embodiment, the sync request for an application is made from a client 101 which can be a mobile device such as a Palm Pilot. The replica of the client application can be located in a server 107 such as a DB2 or Lotus Notes server. The address of the replica (e.g., in a URL format) can be either passed by the client 101, configured in the proxy 102, or obtained from a third party host (e.g., a known directory service). Those skilled in the art will appreciate that the references herein to the client 101 and the server 107 are for the purposes of clarity and convenience. However, it is to be appreciated that they are both computer processing devices which manage applications capable of being synchronized and, thus, their roles and functions may be readily interchanged by one skilled in the art.

The sync handler 305 determines and retrieves all the synchronizable records for the target application from either or both of the client 101 and the server 107 (step 803). With respect to a synchronization task for a target application between two hosts (e.g., the client 101 and the server 107), the phrase "synchronizable record" is used herein to refer to a modified record in one of the hosts (e.g., the client 101), wherein the modifications to this modified record can be replicated to the corresponding, same record (referred to as the replica) in the other host (e.g., the server 107). The determination of whether the modifications can be replicated to the corresponding record is performed by the sync handler process. A modified record of the target application in the preceding scenario (client-server synchronization) is a record (of the target application) that has been updated, deleted, or inserted since the last time the two hosts synchronized on this target application.

The determination of whether a record is synchronizable is based on several criteria. The first criteria is the modification status. With respect to a synchronization task between two computing devices, a synchronizable record in one of these devices must be a modified record since the two devices last synchronized. A record is modified if it is updated, deleted, or newly inserted. The second criteria is the sync action configuration in the sync plan. If, in the sync plan for this application, the user indicated that the sync action for the whole target application is "download" or "upload" only, then the modified records in the client 101 are not considered a synchronizable record for the "download" only configuration; and those in the server 107 are not considered a synchronizable record for the "upload" only configuration. The third criteria is the version dependency and conflict detection results. If update information such as the "dirty" bit, the delete bit, the update log, and/or version data (e.g., version vectors) exists, then it is possible to retrieve this information from both hosts before any actual records are transmitted. Based on this information, version dependency and conflicts may be detected.

If a version dependency exists between two modified replicas of the same record (e.g., from the client 101 and the server 107), then the replica that is the derivation of the other replica is considered a synchronizable record whereas the other replica is not so considered. This scenario may occur when there are more than two devices (e.g., the client 101 and the server 107) participating in the synchronization of a target application. In the two-device sync scenario, a dirty bit and a delete bit for each record may suffice in determining the modification status, as these bits are reset after each synchronization activity. Since, in this scenario, one device can only get changes from the other device through synchronization which always resets the version bits (e.g., dirty or delete bit), version dependency between two modified replicas of the same record cannot exist.

It is to be appreciated that any of the existing prior art methods directed to the version dependency and conflict detection problem may be used in conjunction with the present invention (in particular, with respect to step 803 of FIG. 8).

For each synchronizable record (from either device), the sync handler 305 starts the synchronizer process (described further with respect to FIG. 9 below) (step 805).

Figure 9:
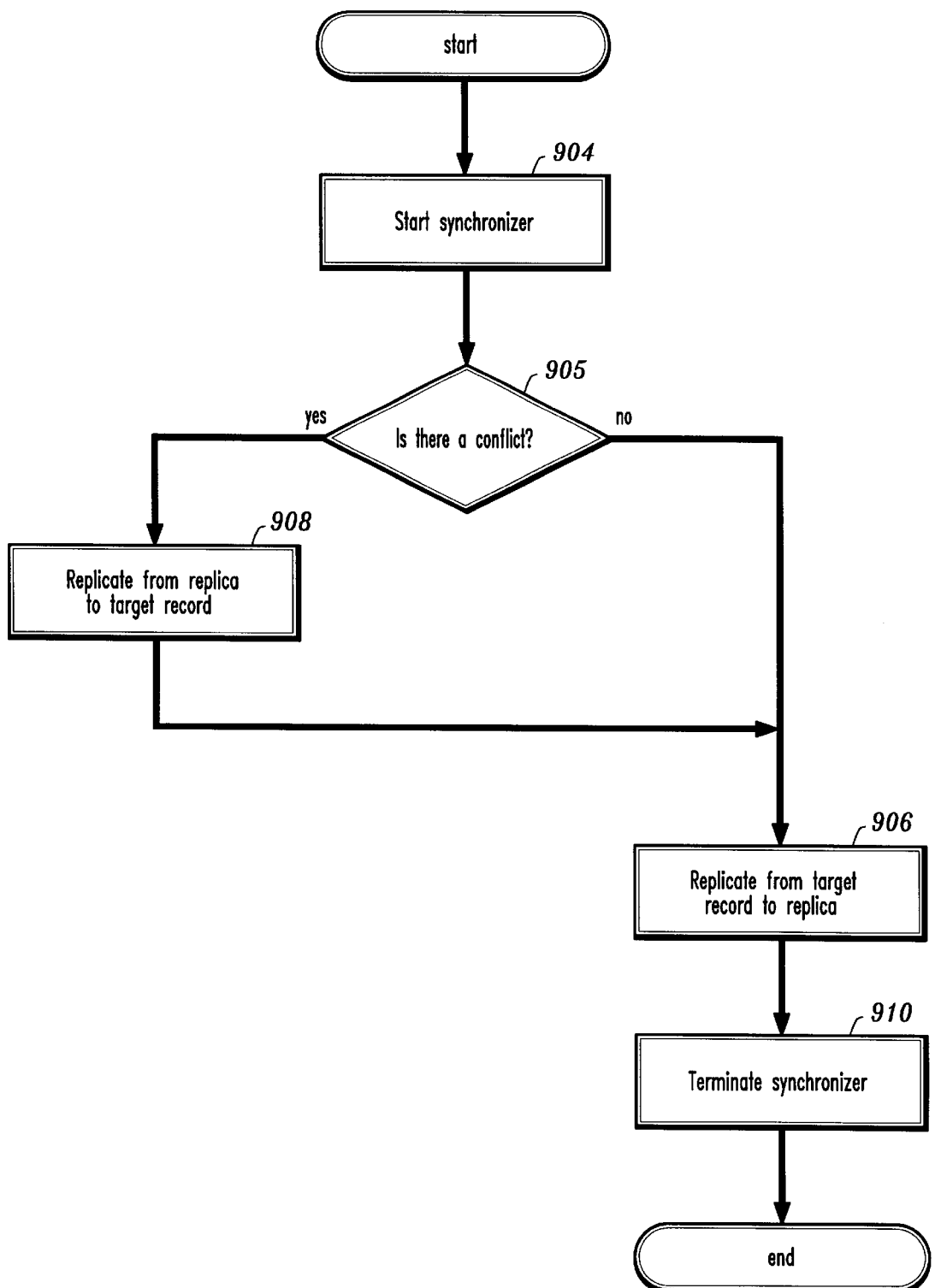
FIG. 9 is a flow chart illustrating a synchronizer process according to an embodiment of the present invention.

FIG. 9 is a flow chart illustrating a synchronizer process according to an embodiment of the present invention. The synchronizer process is started (step 904) by the sync handler process (FIG. 8) with three input objects: a synchronizable record (from either device); the sync plan; and the sync schema for this sync task. It is then determined whether a conflict exists between a synchronizable record (referred to as the target record) and the same record (referred to as the replica) from the other device (step 905). Because conflict detection has already been done by the sync handler 305 (in Step 803 of FIG. 8, e.g., based on comparing the update information such as the dirty bit and/or the delete bit from both replicas), it is known by the synchronizer process if the synchronizable record (target record) has a potential conflict with the same record (the replica) from the other device.

If no conflict exists between the target record and the replica, then the synchronizer determines which data units in the replica are to be updated with information from the target record (based on the sync plan and the sync schema), and replicates those data units in the target record (with recent modifications) to the replica (step 906). Since the synchronizer already has a copy of the target record (step 803 of FIG. 8), the synchronizer simply uses the data units from the copy of the target record to update the corresponding data units in the replica by issuing API calls. The use of the sync plan and the sync schema to determine which data units in the replica are to be updated with information from the target record is further described with respect to FIG. 10 below.

If a conflict is determined to exist at step 905 between the target record and the replica, then the synchronizer processes replication both ways. First, based on the sync plan and the sync schema, the synchronizer determines the data units that are to be replicated from the replica to the target and replicates them accordingly (step 908). Next, and also based on the sync plan and the sync schema, the synchronizer determines the data units that are to be replicated from the target record to the replica, and replicates them accordingly (step 906). One skilled in the art can appreciate that steps 908 and 906 can be readily reversed if a conflict is determined to exist. After synchronization is completed in both directions, the synchronizer proceeds to step 910 to terminate this synchronization task.

Note that in a conflict situation, it is possible that both copies of the same record are determined to be the synchronizable record by the sync handler process (of FIG. 8). Therefore, when the synchronizer process (FIG. 9) is performed on either record, the other record may have already been retrieved by the proxy 102, eliminating the need for retrieving the other record again. Furthermore, when the synchronizer process (FIG. 9) is complete with respect to either record, there is no need to perform the synchronizer process on the other record since the two records are already synchronized.

Figure 10:
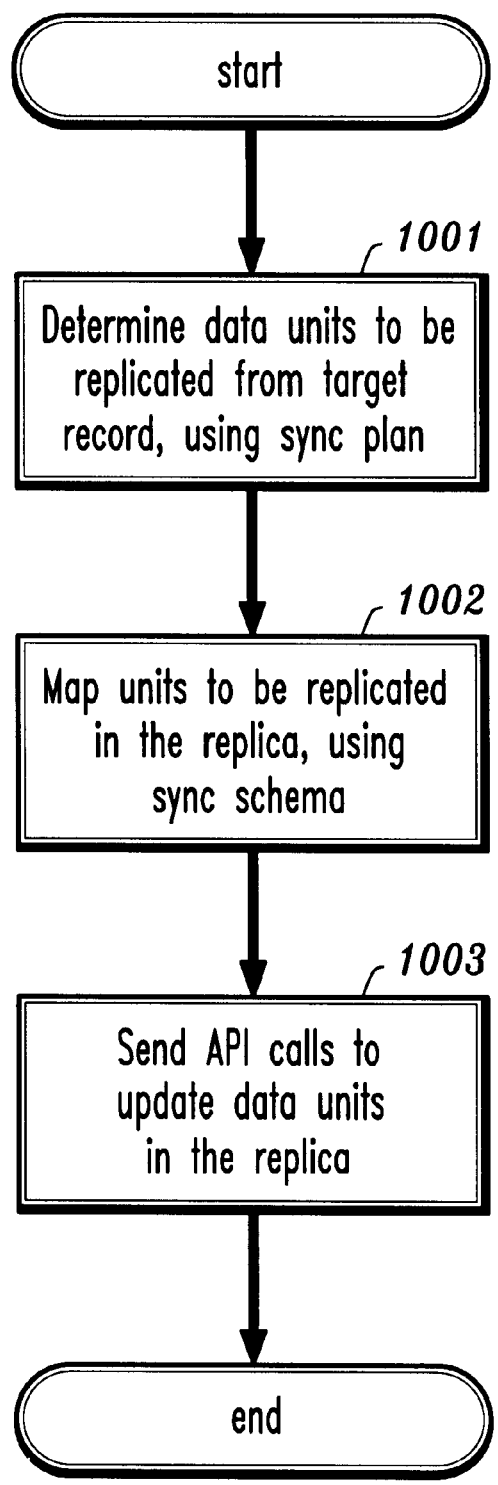
FIG. 10 is a flow chart illustrating a method for replicating information from a target record to its replica according to an embodiment of the present invention.

FIG. 10 is a flow chart illustrating a method for replicating information from a target record to its replica according to an embodiment of the present invention. In particular, FIG. 10 illustrates the replication steps of the synchronizer process of FIG. 9 according to an embodiment of the present invention.

Instead of copying the entire target record over its replica, the present invention, in providing a fine-grained approach to replication, allows each sub-record data unit (down to the smallest indivisible unit) within the target record to have its own sync action configuration specified in the sync plan. The synchronizer uses the sync action configuration for each data unit in the sync plan to determine which data units in the target record are to be replicated to the replica (step 1001). When the set of data units to be replicated is determined, the synchronizer uses the sync schema to map each of these data units from the target record's data structure to the replica's data structure (step 1002). Next, knowing which data units are to be updated in the replica, the synchronizer sends API calls to the device hosting the replica (called the replica host) with new values for these data units (step 1003). Upon receiving these API calls with values, the sync API process 206 (depicted in FIG. 6) of the replica host will update the corresponding data units in the replica properly with the new values from the target record.

Figure 11:
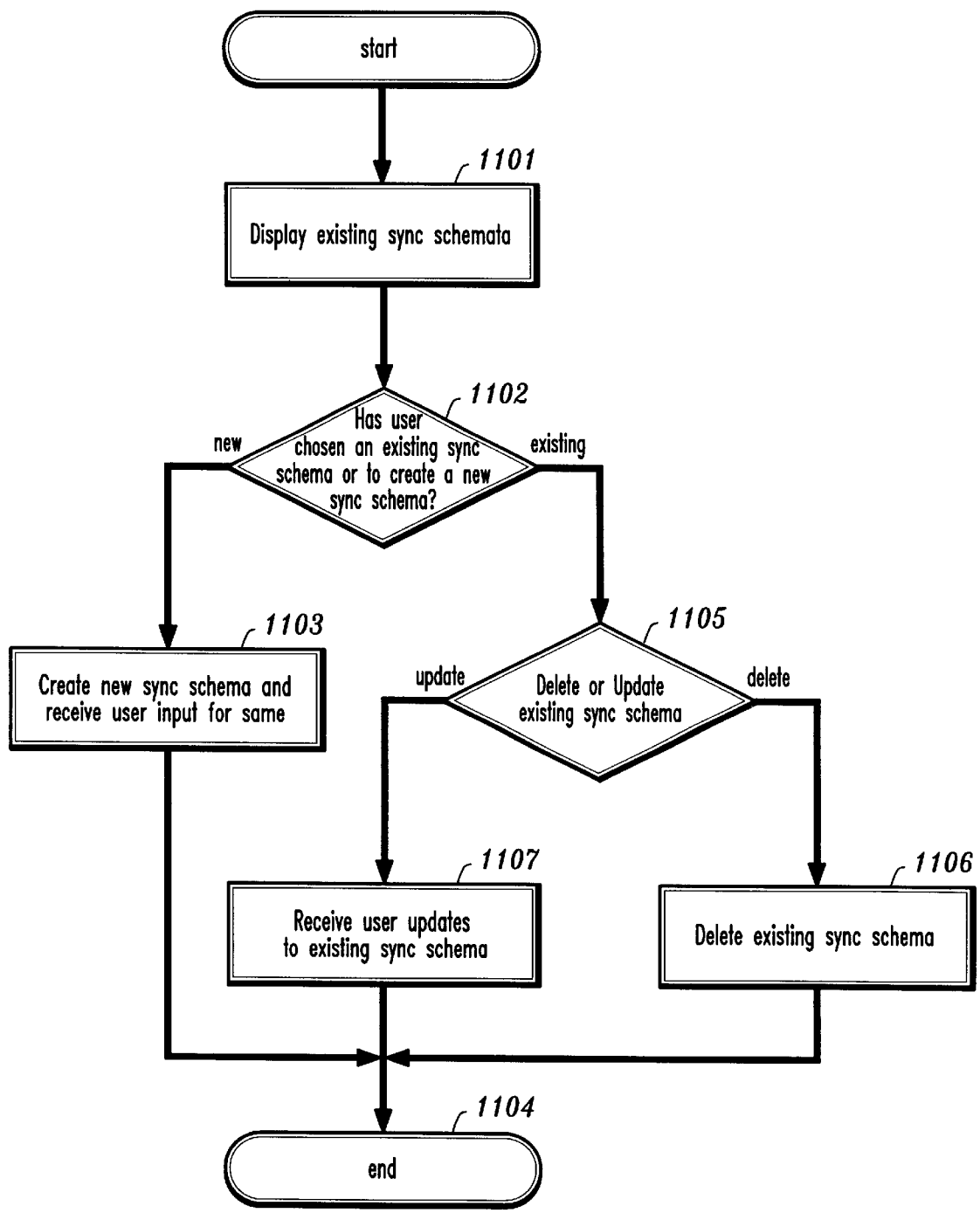
FIG. 11 is a flow chart illustrating a sync schema manager process according to an embodiment of the present invention.

FIG. 11 is a flow chart illustrating a sync schema manager process 307 according to an embodiment of the present invention. The sync schema manager process 307 can be invoked by the administrator to create or update a sync schema. The administrator can interact with the sync schema manager process 307 using some user interface functions through the input/output devices 208 (e.g., keyboard, display device, pen input).

Upon starting the sync schema manager, a list of existing sync schemata is displayed (step 1101), and it is determined whether the user has chosen an existing sync schema or to create a new sync schema (step 1102). If the user has chosen to create a new sync schema, then a new sync schema is created and sync schema information regarding the same is received (by user input) (step 1103) before the sync schema manager process is terminated (step 1104).

On the other hand, if the user has chosen an existing sync schema, then it is determined whether the user has further chosen to delete or update the existing sync schema (step 1105). If the user has chosen to delete the existing sync schema, then the existing sync schema is deleted (step 1106). On the other hand, if the user has chosen to update the existing sync schema, then updated sync schema information for the existing sync schema is received (by user input) (step 1107). Upon receiving information for the new sync schema (at step 1103), receiving updates to the existing sync schema (at step 1107), or deleting the existing sync schema (at step 1106), the sync schema manager process is terminated (step 1108).

A synchronization scenario in which the present invention is employed will now be given. A salesperson is synchronizing a customer report application between a Palm Pilot and a relational database (such as, for example, DB2). In the Palm Pilot, each record of this application has five first-level fields: ID; Name; Location; Rating; and Notes. The field Location can be subdivided into second-level fields Address and Phone. The field Rating records the importance of this customer to the user's organization. The field Notes can be further divided into second-level fields Corporate notes and Personal notes, which respectively represent comments from the user's higher management and the user himself.

Figure 12:
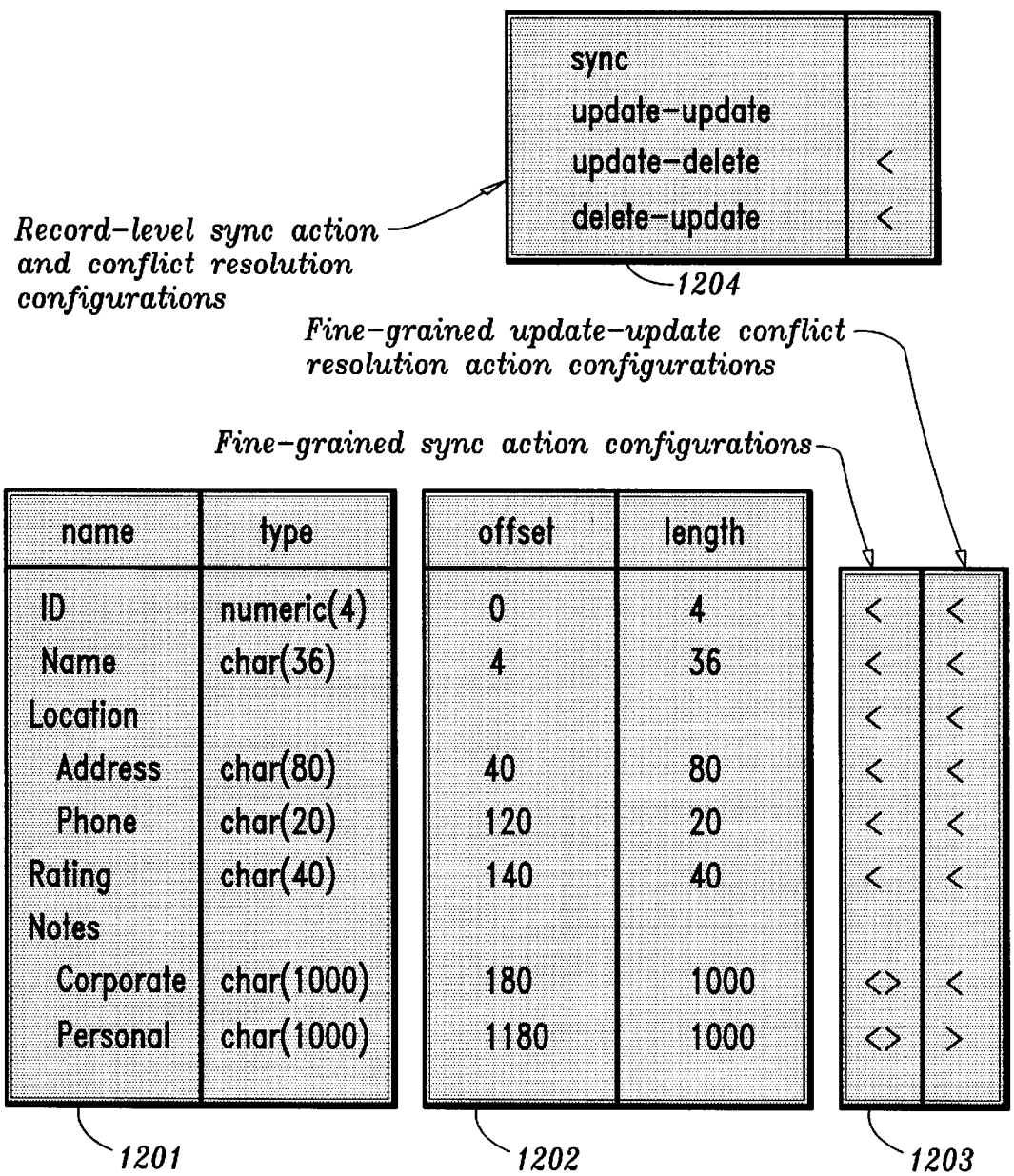
FIG. 12 is a diagram illustrating a sync plan according to an embodiment of the present invention.

FIG. 12 is a diagram illustrating a sync plan according to an embodiment of the present invention. In particular, FIG. 12 depicts an example of a sync plan for this application in the Palm Pilot. In this illustrative sync plan, Table 1201 represents data structure information and Table 1202 represents storage access information of the customer report record. Note that in Table 1201, the field Location is composed of two sub-fields (i.e., Address and Phone), and the field Notes is also composed of two sub-fields (i.e., Corporate and Personal). In Table 1202, the storage access information for each field contains two numbers, namely, offset and length. The offset of a field corresponds to the number of bytes from the location in the memory where the beginning of the whole record is stored to the memory location where the particular field begins. The length is the memory needed (represented by a particular number of bytes) to store this field.

Figure 13:
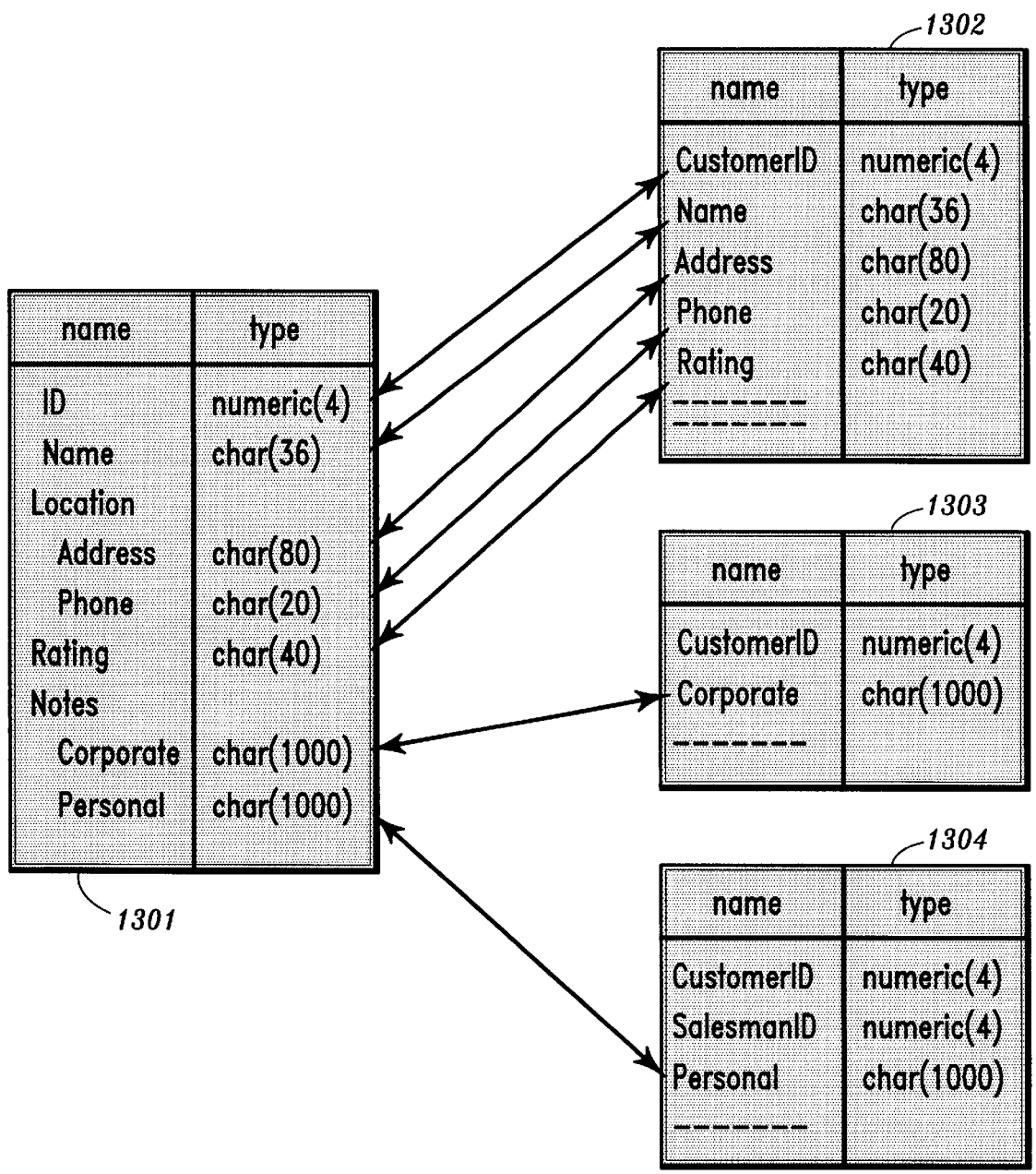
FIG. 13 is a diagram illustrating a sync schema according to an embodiment of the present invention.

The data structure information depicted in FIGS. 12 and 13 represents only one of many ways of representing a data structure. Given the teachings of the invention provided herein, one of ordinary skill in the related art will be able to contemplate these and similar implementations of the present invention using any of the numerous existing formats for representing data. For example, for web objects, XML (extensive Markup Language) may be used. For data managed by a DBMS (DataBase Management System), DDL (Data Definition Language) may be used.

Those skilled in the related art will appreciate that storage access information is different for different data storage formats. The example in FIG. 12 is based on the record having a data storage format which is a contiguous array of bytes. The storage access information of this example is therefore the offset and length of each data unit. For other data storage formats, the storage access information may be different. For example, for a relational database application, the storage access information for a data unit can be its column name, table name, and database name. For an even more complex data storage system, where no simple configurations can provide adequate information to access a particular data unit, it is possible to provide a script which can be interpreted dynamically (when the proxy 102 requests access to this data unit) by the device hosting this data unit. The script can include conditional logic which provides more "expressing power" to describe the storage access information.

Table 1204 represents the sync actions and conflict resolution configurations at the "whole-record" level. The first row is the configuration for sync action in which the user may specify "download", "upload", or "two-way". In this example, there is no sync action specified at this level because the sync actions are specified at a finer grain level (in Table 1203). The second through fourth rows represent the configurations for conflict resolution actions at the whole-record level. In this example, no actions are specified for "update-update" conflict as they are specified at a finer grain level (in Table 1203). Note that in a system where sync actions are allowed to be specified at multiple levels simultaneously, conflicting actions may exist between different levels (e.g., "download" only at one level and "upload" only at another level). In such a case, it is up to the developers and administrators of the system to enforce an override rule such as a higher level always overrides a lower level, or vice versa.

Table 1203 represents the sync and conflict resolution action configurations at the lowest (finest grain) level. Each indivisible data unit has associated therewith a sync action and a conflict resolution action. In this exemplified sync plan, the user specifies that the sync action is "download" for fields ID, Name, Address, Phone, and Rating, and "two-way" for Corporate Notes and Personal Notes. As for conflict resolution action, it is "server-overrides-client" for all fields except for Personal Notes which is "client-overrides-server".

FIG. 13 is a diagram illustrating a sync schema according to an embodiment of the present invention. In particular, FIG. 13 depicts an example of the sync schema for the synchronization scenario. Table 1301 is the data structure information of the customer report record in the Palm Pilot. Table 1302 is the customer table in the relational database managed by the server 107. Table 1303 is the corporate notes table in the relational database managed by the server 107. Table 1304 is the personal notes table in the relational database managed by the server 107. The sync schema stores the mappings between the data units (fields) from the Palm Pilot customer report record and their counterparts in the relational tables stored in the server database. Note that different fields from the Palm Pilot customer report records may have a replica stored in different tables in the server database.

With respect to the synchronizer process of FIG. 9, if no conflict exists for the target record, then the synchronizer processes step 906 (which is described in further detail in FIG. 10). Suppose a Palm Pilot customer report record is the target record. Since the sync action for fields ID, Name, Address, Phone, and Rating is "download" only (see FIG. 12), this information in the target record needs not be replicated to the server database. Only fields Corporate Notes and Personal Notes need to be replicated. This determination is performed in step 1001 of FIG. 10. Next, the synchronizer process (shown in FIG. 9) uses the sync schema (shown in FIG. 13) to respectively map the fields Corporate Notes and Personal Notes from the Palm Pilot to the Corporate field in Table 1303 and the Personal field in Table 1304 in the server database. This is performed in step 1002 of FIG. 10. Finally, the synchronizer process issues two API calls to the server database to respectively update the Corporate and Personal fields in their own table with the values of the Corporate and Personal fields from the target record of the Palm Pilot.

This scenario demonstrates one of the primary advantages of the present invention, namely, that the entire target record from the Palm Pilot is not sent to the server database. Instead, only the data of the Corporate and Personal fields from the Palm Pilot is sent to the server database to update the tables in which the replicas of these two fields are respectively stored. As a result, network bandwidth usage is more efficient using the sync plan method. In addition, Table 1301, which is updated if the entire target record is to be replicated, is not updated at all. Therefore, the sync plan method of the present invention can also reduce data update activities.

In FIG. 9, if a conflict existed between the target record and its replica, then the synchronizer processes step 908 using the sync plan and sync schema with procedures similar to those described above. However, to resolve conflict, the synchronizer first examines the conflict resolution action specified in the sync plan (second column of Table 1203). In the exemplified sync plan (shown in FIG. 13), all fields have a configuration of "server-overrides-client" for conflict resolution action, except for the Personal field which is configured the opposite way. Based on this information, Tables 1301 and 1302 are selected and data of the fields ID, Name, Address, Phone, Rating, and Corporate are retrieved from the two tables and replicated to the target record of the Palm Pilot. The data in the Personal fields of the target record from the Palm Pilot is replicated to the Personal field of Table 1303 in the server database.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for performing synchronization between a first replica associated with an application in a first computer processing device and a second replica associated with the application in a second computer processing device, the method comprising the steps of:

generating at least one synchronization plan for the replicas for managing the synchronization therebetween, the sync plan comprising data structure information corresponding to data structures of the replicas, storage access information for enabling access to each individual data unit within the data structures of the replicas, and synchronization and conflict resolution actions for specifying actions to be taken for each individual data unit with respect to the synchronization and any conflicts resulting therefrom; and synchronizing at least one individual data unit in the first replica with a corresponding individual data unit in the second replica, in accordance with the sync plan, wherein the synchronization and conflict resolution actions have a capability of comprising different conflict resolution actions for different levels of the replicas and for different synchronizations between the replicas.

2. The method according to claim 1, further comprising the step of organizing the data structure information in a hierarchal order.

3. The method according to claim 2, wherein the hierarchal order comprises a replica level corresponding to the entire replica and an indivisible data unit level corresponding to a smallest possible data unit within the data structures.

4. The method according to claim 1, wherein each of the individual data units corresponds to a smallest possible data unit within the data structures.

5. The method according to claim 1, further comprising the step of enabling an individual to at least one of create, update, and delete the synchronization plan using an input/output device of at least one of the first and the second computer processing devices.

6. The method according to claim 1, further comprising the step of generating a mapping of the data structures of the first and the second replica so as to link each data unit participating in the synchronization in the first computer processing device with a corresponding data unit in the second computer processing device.

7. The method according to claim 6, wherein said synchronizing step is performed by one of the first and the second computer processing devices, and further comprises the steps of:

determining and retrieving portions of the first and the second replicas that are to be replicated, in accordance with the synchronization plan;

determining whether the conflicts exist between the portions of the first and the second replicas that are to be replicated;

resolving the conflicts when the conflicts exist, in accordance with the synchronization plan; and replicating the portions of the first and the second replicas that are to be replicated, in accordance with the synchronization plan and the mapping.

8. The method according to claim 7, wherein said synchronizing step further comprises the step of obtaining the synchronization plan and the mapping, when the synchronization plan and the mapping are not included in whichever of the first and the second computer processing devices that is to perform said synchronizing step.

9. The method according to claim 6, wherein said synchronizing step is performed by another computer, and further comprises the steps of:

determining and retrieving portions of the first and the second replicas that are to be replicated, based on the synchronization plan;

determining whether the conflicts exist between the portions of the first and the second replicas that are to be replicated;

resolving the conflicts when the conflicts exist, in accordance with the synchronization plan; and replicating the portions of the first and the second replicas that are to be replicated, in accordance with the synchronization plan and the mapping.

10. The method according to claim 9, wherein said synchronizing step further comprises the step of obtaining the synchronization plan and the mapping, when the synchronization plan and the mapping are not included in the other computer processing device.

11. The method according to claim 1, wherein the data structures of the first and the second replicas are different.

12. The method according to claim 1, wherein the first and the second computer processing devices are coupled through a network.

13. The method according to claim 8, wherein at least one of the two replicas is one of stored and obtained by an other computer processing device having one of a continuous and an intermittent connection to the network.

14. The method according to claim 13, wherein said synchronizing step is performed in the other computer processing device.

15. The method according to claim 13, further comprising the step of storing the synchronization plan in the other computer processing device.

16. The method according to claim 13, further comprising the step of enabling an individual to at least one of create, update, and delete the synchronization plan using an input/output device of the other computer processing device.

17. The method according to claim 1, wherein said synchronizing step is performed in one of the first and the second computer processing devices.

18. The method according to claim 1, further comprising the step of storing the synchronization plan in one of the first and the second computer processing devices.

19. The method of claim 1, wherein said generating step comprises the steps of:

selecting a first set of conflict resolution actions for a first synchronization between the replicas; and selecting a second set of conflict resolutions actions for a subsequent synchronization between the replicas with respect to the first synchronization, said selecting steps being performed by at least one user of at least one of the first computer processing device and the second computer processing device, the second set of conflict resolution actions comprising at least one conflict resolution action that is absent from the first set of conflict resolution actions.

20. A program storage device readable by machine, tangibly embodying a program of instructions executable by the machine to perform steps for synchronization between a first replica associated with an application in a first computer processing device and a second replica associated with the application in a second computer processing device, said method steps comprising:

generating at least one synchronization plan for the replicas for managing the synchronization therebetween, the sync plan comprising data structure information corresponding to data structures of the replicas, storage access information for enabling access to each individual data unit within the data structures of the replicas, and synchronization and conflict resolution actions for specifying actions to be taken for each individual data unit with respect to the synchronization and any conflicts resulting therefrom; and synchronizing at least one individual data unit in the first replica with a corresponding individual data unit in the second replica, in accordance with the sync plan, wherein the synchronization and conflict resolution actions have a capability of comprising different conflict resolution actions for different. levels of the replicas and for different synchronizations between the replicas.

21. The program storage device of claim 20, further comprising the step of organizing the data structure information in a hierarchal order.

22. The program storage device according to claim 21, wherein the hierarchal order comprises a replica level corresponding to the entire replica and an indivisible data unit level corresponding to a smallest possible data unit within the data structures.

23. The program storage device according to claim 20, wherein each of the individual data units corresponds to a smallest possible data unit within the data structures.

24. The program storage device according to claim 20, further comprising the step of enabling an individual to at least one of create, update, and delete the synchronization plan using an input/output device of at least one of the first and the second computer processing devices.

25. The program storage device according to claim 20, further comprising the step of generating a mapping of the data structures of the first and the second replica so as to link each data unit participating in the synchronization in the first computer processing device with a corresponding data unit in the second computer processing device.

26. The program storage device according to claim 25, wherein said synchronizing step is performed by one of the first and the second computer processing devices, and further comprises the steps of:

determining and retrieving portions of the first and the second replicas that are to be replicated, in accordance with the synchronization plan;

determining whether the conflicts exist between the portions of the first and the second replicas that are to be replicated;

resolving the conflicts when the conflicts exist, in accordance with the synchronization plan; and replicating the portions of the first and the second replicas that are to be replicated, in accordance with the synchronization plan and the mapping.

27. The program storage device according to claim 26, wherein said synchronizing step further comprises the step of obtaining the synchronization plan and the mapping, when the synchronization plan and the mapping are not included in whichever of the first and the second computer processing devices that is to perform said synchronizing step.

28. The program storage device according to claim 25, wherein said synchronizing step is performed by another computer, and further comprises the steps of:

determining and retrieving portions of the first and the second replicas that are to be replicated, based on the synchronization plan;

determining whether the conflicts exist between the portions of the first and the second replicas that are to be replicated;

resolving the conflicts when the conflicts exist, in accordance with the synchronization plan; and replicating the portions of the first and the second replicas that are to be replicated, in accordance with the synchronization plan and the mapping.

29. The program storage device according to claim 28, wherein said synchronizing step further comprises the step of obtaining the synchronization plan and the mapping, when the synchronization plan and the mapping are not included in the other computer processing device.

30. The program storage device according to claim 20, wherein the data structures of the first and the second replicas are different.

31. The program storage device according to claim 20, wherein the first and the second computer processing devices are coupled through a network.

32. The program storage device according to claim 31, wherein at least one of the two replicas is one of stored and obtained by an other computer processing device having one of a continuous and an intermittent connection to the network.

33. The program storage device according to claim 32, wherein said synchronizing step is performed in the other computer processing device.

34. The program storage device according to claim 32, further comprising the step of storing the synchronization plan in the other computer processing device.

35. The program storage device according to claim 32, further comprising the step of enabling an individual to at least one of create, update, and delete the synchronization plan using an input/output device of the other computer processing device.

36. The program storage device according to claim 20, wherein said synchronizing step is performed in one of the first and the second computer processing devices.

37. The program storage device according to claim 20, further comprising the step of storing the synchronization plan in one of the first and the second computer processing devices.

* * * * *